Sept. 8, 1959 J. SINDEL ET AL 2,903,498
PRIMARY DRY CELL
Filed Nov. 25, 1957

INVENTORS
JOHANN SINDEL
R. HUBER
OTTO ZOTTMANN
BY Erich M. H. Radde
AGENT

United States Patent Office 2,903,498
Patented Sept. 8, 1959

2,903,498

PRIMARY DRY CELL

Johann Sindel and Richard Huber, Ellwangen, Jagst, Germany, and Otto Zottmann, Sao Paulo, Brazil, assignors to Pertrix-Union G.m.b.H., Ellwangen, Jagst, Germany, a corporation of Germany Application November 25, 1957, Serial No. 698,865

4 Claims. (Cl. 136—95)

The present invention relates to primary dry cells, and more particularly to primary dry cells with a soluble negative electrode and a molded depolarizer element of specific composition.

It is the principal object of this invention to provide primary dry cells of the above type, which are particularly adapted for storage and/or use at elevated temperatures, for instance, in a tropical climate.

It is a more specific object of the invention to provide such cells which will not expand, i.e. which will not swell at elevated temperature, for instance, at tropical temperatures and which do not require pressure-resistant seals.

It has been found that primary cells tend to expand or swell when used at elevated temperature, for instance, in the tropics. This often leads to the overflow of electrolyte from the cell and, at times, the depolarizer element itself is forced out of the cell. Even if the cell is not completely destroyed, such expansion damages the cell because the film of electrolyte on the surface of the negative electrode cracks, thus, providing a surface of attack for premature corrosion.

In an effort to avoid these disadvantages, such cells have been placed in pressure-resistant containers. However, this considerably increases the production cost of the cells and, in addition, it does not completely eliminate the swelling in the interior but merely hides it from sight.

In accordance with the present invention, the above and other objects are accomplished and the disadvantages obviated by providing a porous molded depolarizer element and filling no more than about 75% of the volume of the pores of the depolarizer with an electrolyte having a specific weight of at least about 1.2 g./cc., the free volume of pores being between about 26% and about 40% of the total volume of pores.

The electrolyte should fill not less than about 64% of the volume of pores of the depolarizer element, the preferred range being between 67% and 70% of the volyme of pores.

The specific weight of the electrolyte should not exceed about 1.6 g./cc., the preferred specific weight being between about 1.24 g./cc. and about 1.28 g./cc.

Since no more than about 75% of the volume of the pores of the depolarizer is filled with electrolyte, it is possible for the electrolyte as well as for the gases in the porous molded depolarizer element to expand at elevated temperatures. The expanding gases may simply escape.

Obviously, the porous depolarizer must have a minimum volume of pores to make the above conditions possible. It has been found that it is not possible to press or mold the depolarizer into shape and that it will break into small pieces if no more than 75% of its volume of pores is filled with electrolyte and the free volume of pores is between about 26% and about 40% of the total volume of pores unless the minimum specific weight of the electrolyte which fills the depolarizer is 1.2 g./cc. This electrolyte will be termed "inner electrolyte" throughout the specification and in the claims.

Surprisingly, the use of such an inner electrolyte will prevent crumbling of the depolarizer element despite the reduced electrolyte amount and the relatively large volume of pores.

Accordingly, we have found that the combination of the three mentioned features will provide a primary dry electrolytic cell in which the basic causes for swelling under elevated temperature conditions are eliminated. Therefore, we provide an improved dry cell which requires no fluid-tight container with its attendant extra cost.

In accordance with one preferred embodiment of the present invention, the electrolyte outside the depolarizer contains, in addition to the conventional thickening agents, an additive capable of increasing its initial viscosity. The electrolyte which does not fill the pores of the depolarizer will be termed "outer electrolyte" throughout the specification and the claims.

The advantage of providing the viscosity-increasing additive in the outer electrolyte resides in the fact that this will prevent a relatively fluid outer electrolyte from penetrating into and clogging the pores of the depolarizer, which would counteract the purposes and objects of the invention.

Conventional thickeners for electrolytes includes wheat and rye flour, starch, such as potato, wheat, or corn starch, and the like, as well as mixtures thereof.

Preferred viscosity-increasing additives include cellulose derivatives, such as the sodium or potassium salts of carboxymethyl or carboxyethyl cellulose, locust bean gum or carob seed gum, refined guar gum, polyvinyl alcohols, methyl cellulose known to the trade as "Methocel," ethyl cellulose known to the trade as "Ethocel," and others.

The viscosity-increasing additives may be added to the outer electrolyte in amounts of 0.5% to 3.0% by weight, preferably in amounts of 0.7% to 1.0% by weight.

In accordance with another preferred embodiment of the present invention, we have found that it is most advantageous if from 10% to 30% of the mass of the depolarizer element has a particle size exceeding $120\mu$. The particle size in the depolarizer element should not exceed $200\mu$ and the preferred range of particles between $120\mu$ and $200\mu$ is between 12.5% and 15.5%, based on the total dry depolarizer mass. This large particle size has the advantage that it assures the critical volume ratios of the pores to total volume of the molded depolarizer as well as to the inner electrolyte without increasing the cost of the milling of the depolarizer mass.

It is preferred for the molded depolarizer mass to contain no particles of a size smaller than $10\mu$. The amount of the particles between $120\mu$ and $40\mu$ is preferably between 61.5% and 64.5% of the dry depolarizer mass. The carbon black and ammonium chloride portion of the mass amounts to about 23% of the dry mass and this portion has a particle size below 40μ.

With these particle sizes of the depolarizer mass, sufficient expansion space is assured to avoid swelling under high temperature and conditions.

If desired, the porosity of the depolarizer element may be further increased by adding to the mass inert ingredients. Such inert substances may be used to correct otherwise undesirable particle size of the mass and, thus, further simplify the manufacture without impairing the purposes of the invention.

Suitable inert substances which may be added to the depolarizer mass to increase its porosity include particulate silicon dioxide, granulated coke, or granulated plastic materials which are inert to the electrolyte. The particle size of the inert substances depends on the particle size of the depolarizer and is preferably between 120μ and 200μ. For instance, if the depolarizer contains natural manganese dioxide 90% of which has a particle size of less than 60μ, about 15% to 20% of an inert granular substance of a particle size between 120μ and 200μ will be added thereto. If only 80% of the manganese dioxide has a particle size below 60μ, an addition of 5% to 10% of the inert substance will suffice.

We have found it of particular advantage to make the lead connected to the depolarizer element permeable to gas. This makes it possible for expanding gases formed in the depolarizer at high temperatures to escape through the lead. For instance, the lead may be a sufficiently porous carbon rod.

A suitable carbon rod of this type may be made by mixing the carbon mass with sawdust or other gas-forming agents and subsequently sintering the mass. The carbon rod is then impregnated with paraffin oil so that it is gas-permeable while being impermeable to the electrolyte. Obviously, the gas permeability of the carbon rod leads may vary considerably. Measuring the gas permeability of the rod by its permeability to air in cc./min., with an air path of 10 mm. through the rod and an air pressure of 0.79 atmospheres, a value of 3 cc./min. with a rod of 8 mm. diameter has been found satisfactory. Such rods are manufactured, for instance, by Ringsdorff-Werke G.m.b.H., of Mehlem, Germany.

While any of the known dry cells may be used for the purpose of the present invention, it may be described more in detail hereinafter in connection with the most frequently used round dry cells which are composed as follows:

(1) The depolarizer element of manganese dioxide and graphite or carbon black, carrying the inner electrolyte.

(2) The layer of gelatinous paste between said depolarizer element and the zinc cup or can serving as carrier of the outer electrolyte and as diaphragm between the electrodes.

(3) The central porous carbon rod embedded in the depolarizer element, called the positive electrode which, strictly speaking is the collector and conductor of electric current from the depolarizer element which is actually the cathode, to the positive terminal.

(4) The zinc cup or can serving as anode and container of the cell.

(5) The top seal of insulating material closing the cell and making it available for use in any position.

It is, of course, understood that stacked units of flat cells may also be used for the purpose of the present invention. Each individual cell of such stacks of flat cells as they are used in radio batteries are characterized, for instance, by (1) A flat sheet of zinc coated on one side with an adherent coating of granular carbon mixed with a suitable binder, preferably of plastic material. This zinc plate with its free zinc surface serves as the anode of one cell and with its carbon coated side as the cathode collector corresponding to the carbon rod in a dry round cell of the adjacent cell.

(2) The depolarizer consists of a molded depolarizer element according to the present invention and is impregnated with the inner electrolyte.

(3) A paper separator to which a cereal paste serving as the outer electrolyte is applied.

The parts of such flat cells, thus, correspond in principle to those of round cells.

These round and flat cells are illustrated in the accompanying drawing without, however, limiting the invention thereto.

In said drawing

Fig. 1 is a cross-sectional view through a customary round dry cell while

Figure 1:
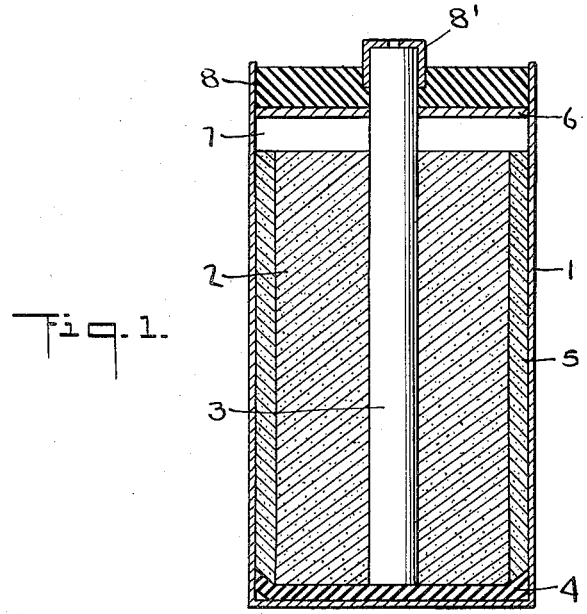

In said Fig. 1 zinc can 1 is of cylindrical form and closed at its bottom. Bobbin or dolly 2 of the depolarizing element is previously molded from the mixture of manganese dioxide, preferably natural manganese dioxide which may also be mixed with small amounts of artificial manganese dioxide, and natural or synthetic graphite or carbon black, such as acetylene black. The ratio of manganeses dioxide to carbon may vary from about 3 to 1 to about 8 to 1 by weight. Usually, part of the ammonium chloride composing the inner electrolyte is admixed in dry form. Thereafter part of the inner electrolyte is added to impart to the mixture the desired wetness. The mixture is then compacted and molded in a suitable mold to the exact diameter and height required. The diameter of the resulting bobbin must be less than that of the interior diameter of the zinc can so that sufficient space for the electrolytic paste is provided. The bobbins may also be wrapped with muslin yielding the so-called bag-type cells.

Carbon rod 3 may be placed into bobbin 2 after it has been molded. It may also be present in the depolarizer mixture during molding of the bobbin.

When placing bobbin 2 and carbon rod 3 into zinc can 1, washer 4 with up-turned corners or the like may be placed on the bottom of the zinc can to center the bobbin.

The gelatinized paste 5, also called outer electrolyte, is prepared in the usual manner and is used as cooked paste or as cold-setting paste. The paste is filled in liquid form into the space between bobbin 2 and zinc can 1 until it reaches the full height of the bobbin but does not exceed it.

After gelatinizing the paste 5 an impregnated cardboard washer 6 is slipped over carbon rod 3 to center the same. Between bobbin 2 and washer 6 there is provided the air space 7 as an expansion space. Thereafter, the seal 8 of molten wax or pitch is poured on top of washer 6 to seal the dry cell. The upper end of carbon rod 3 projecting from the cell is provided with brass cap 8.

Figure 2:
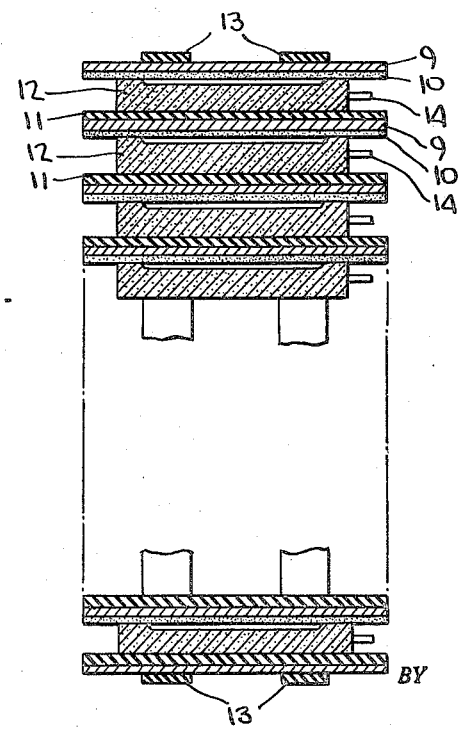
Fig. 2 is a cross-sectional view through a stack of flat cells.

In Fig. 2 sheets of zinc 9 are coated on one side with granular carbon coating 10 while its other clear zinc surface is covered by paper separators 11 impregnated with the cereal paste representing the outer electrolyte. Cake 12 consists of a molded mixture of manganese dioxide and graphite or carbon black and is impregnated with the inner electrolyte according to the present invention. Said cake 12 serves as depolarizer element. The topmost cell is completed by a zinc sheet 9 coated with a granular carbon coating 10 this carbon coating being in connection with the depolarizer cake 12. The resulting stack of cells is bound together by paper tapes 13. The depolarizer element 12 is provided with a slight depression serving as air space and short porous carbon pencils 14 protruding to the outside of the stack are inserted into the depolarizer element 12 to permit escape of gas evolved by local action at the zinc surfaces. The completed stacks are finally dipped into a bituminous compound, such as pitch, to seal the resulting battery.

While the skilled in the art will be able to construct primary dry cells on the basis of the above description of the principles of our invention, the following examples will illustrate certain specific embodiments thereof:

*Example 1*

A molded depolarizer element for a primary dry cell is molded from 77 parts of natural manganese dioxide,
13 parts of carbon black,
10 parts of ammonium chloride,
1 part of zinc oxide, and
20 parts of inner electrolyte having a density d=1.26 are added thereto.

The manganese dioxide powder consists of

25% particles of a size between 100μ and 200μ
25% particles of a size between 60μ and 100μ and
50% particles of a size between 40μ and 60μ.

The inner electrolyte consists of 72 parts of water and
28 parts of zinc chloride.

The outer electrolyte of the electric cell consists of 70 parts of water,
20 parts of ammonium chloride,
10 parts of zinc chloride, and
0.3 part of mercuric chloride.

To thicken the outer electrolyte 0.7 part of carboxyl methyl cellulose,
17 parts of wheat flour, and
4 parts of wheat starch are added per 100 parts of electrolyte.

Conventional zinc or like anodes are used.

*Example 2*

The molded depolarizer element is molded from a finely milled natural manganese dioxide comprising 95% particles smaller than 74μ, and
85% particles smaller than 46μ.

To achieve the required porosity, an inert granular substance is added. The depolarizer element consists of 23 parts of silicon dioxide (which could be replaced by an equal amount of coarser natural manganese dioxide),
13 parts of carbon black,
10 parts of ammonium chloride, and
20 parts of inner electrolyte are added thereto.

The inner electrolyte is an aqueous zinc chloride solution having a density of about 1.30 to 1.32.

The outer electrolyte and the anode were the same as in Example 1.

While the invention has been described in connection with certain now preferred embodiments, it will be understood that many modifications and variations may occur to the skilled in the art, particularly after benefiting from the present teaching, without departing from the spirit and scope of the invention as defined in the appended claims.

We claim:

1. A primary dry cell, comprising a soluble negative electrode, a positive electrode, an inner electrolyte, an outer electrolyte, a molded porous depolarizer element positioned between said negative and said positive electrodes, its pores being partly filled with the inner electrolyte, and a separator layer positioned between, and in contact with, said depolarizer element and said negative electrode and carrying the outer electrolyte, the inner electrolyte filling no more than about 75% of the volume of the pores of the depolarizer element, the specific weight of the inner electrolyte being at least 1.2 g./cc., the outer electrolyte of the separator layer containing at least one thickening agent selected from the group consisting of flour and starch and at least one additive capable of increasing its initial viscosity, said additive being selected from the group consisting of a water soluble cellulose ether, a water soluble carboxy alkyl cellulose, a vegetable gum, and a water soluble polyvinyl alcohol.

2. A primary dry cell comprising a soluble negative electrode, a positive electrode, an inner electrolyte, an outer electrolyte, a molded porous depolarizer element positioned between said negative and said positive electrodes, its pores being partly filled with the inner electrolyte, and a separator layer positioned between and in contact with said depolarizer element and said negative electrode and carrying the outer electrolyte, the inner electrolyte filling between about 64% and about 75% of the volume of the pores of the depolarizer element, the specific weight of the inner electrolyte being between about 1.2 g./cc. and about 1.6 g./cc. the outer electrolyte of the separator layer containing at least one thickening agent selected from the group consisting of flour and starch and between about 0.5% and about 3.0%, based on the total weight of the outer electrolyte, of at least one additive capable of increasing the initial viscosity of said outer electrolyte, said viscosity-increasing additive being selected from the group consisting of a water soluble cellulose ether, a water soluble carboxy alkyl cellulose, a vegetable gum, and a water soluble polyvinyl alcohol.

3. The primary dry cell according to claim 2, wherein the inner electrolyte fills between 67% and 70% of the volume of the pores of the depolarizer element.

4. A primary dry cell comprising a negative zinc electrode, a positive electrode of gas-permeable carbon attached to a depolarizer element, an inner electrolyte consisting of an aqueous zinc chloride solution, the specific weight of said inner electrolyte being between about 1.2 g./cc. and about 1.6 g./cc., an outer electrolyte consisting of an aqueous paste of ammonium chloride, zinc chloride, a small amount of mercuric chloride, starch, flour, and between 0.7% and 1.0% of carboxy methyl cellulose to increase the initial viscosity of said outer electrolyte, a molded porous depolarizer element positioned between said negative and said positive electrodes, said porous depolarizer element consisting of a molded mixture of coarse silicon dioxide as the porosity of the depolarizer element increasing agent, finely milled manganese dioxide, carbon black, and ammonium chloride, the inner electrolyte filling between about 64% and about 75% of the volume of the pores of the depolarizer element.

References Cited in the file of this patent

UNITED STATES PATENTS

| 1,296,700 | Ruhoff | Mar. 11, 1919 |
| 1,518,637 | Olaneta | Dec. 9, 1924 |
| 2,773,926 | Glover | Dec. 11, 1956 |

FOREIGN PATENTS

| 28,755 | Great Britain | Sept. 14, 1911 |

OTHER REFERENCES

Transactions of The Electrochemical Society, vol. 86, 1944, pages 327–328.